(12) United States Patent
Hattori et al.

(10) Patent No.: US 6,477,308 B2
(45) Date of Patent: Nov. 5, 2002

(54) OPTICAL WAVEGUIDE DEVICES AND METHODS OF FABRICATING THE SAME

(75) Inventors: Tetsuya Hattori, Yokohama (JP); Shigeru Semura, Yokohama (JP); Toru Iwashima, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 13 days.

(21) Appl. No.: 09/847,374

(22) Filed: May 3, 2001

(65) Prior Publication Data

US 2001/0041039 A1 Nov. 15, 2001

(30) Foreign Application Priority Data

May 9, 2000 (JP) ........................................ 2000-136269

(51) Int. Cl.[7] .................................................. G02B 6/10
(52) U.S. Cl. ........................ 385/129; 385/141; 385/130; 385/14
(58) Field of Search ................................ 385/129–132, 385/11, 14

(56) References Cited

U.S. PATENT DOCUMENTS

| 5,467,415 | A | * | 11/1995 | Presby | ........................ | 385/14 |
| 5,615,224 | A | | 3/1997 | Daniel et al. | ................. | 372/36 |
| 5,978,539 | A | | 11/1999 | Davies et al. | ................ | 385/129 |
| 6,067,392 | A | | 5/2000 | Wakami et al. | ............... | 385/37 |
| 6,144,795 | A | * | 11/2000 | Dawes et al. | ............... | 385/141 |
| 6,360,047 | B1 | * | 3/2002 | Nekado et al. | .............. | 385/129 |

FOREIGN PATENT DOCUMENTS

| EP | 0535861 A2 | 4/1993 |
| JP | 10039150 | 2/1998 |
| JP | 11109155 A2 | 4/1999 |
| WO | WO 97/26572 | 7/1997 |

OTHER PUBLICATIONS

"Athermal silica–based arrayed–waveguide grating multiplexer", Y. Inoue, et al., Electronics Letters, Nov. 1997, vol. 33, No. 23, p. 1945–1947.

"Coupler case and cover glass for optical fibers", ref. No. 0010–36, Nippon Electric Glass, Ltd. Sep. 2000.

"Temperature compensation for add/drop filter on PLC", Proceedings of the 1999 IEICE General Conference, 1999.

"Athermal and center wavlength adjustable arrayed–wavelength grating", K. Maru et al. No Date.

* cited by examiner

Primary Examiner—Phan T. H. Palmer
(74) Attorney, Agent, or Firm—McDermott, Will & Emery (57) ABSTRACT

The present invention concerns an optical waveguide device having a structure for effectively suppressing variation in optical characteristics due to temperature change without causing increase in device size, and a fabrication method thereof. The optical waveguide device has a structure in which a first main member having a positive coefficient of linear expansion is fixed to a sub member having a negative coefficient of linear expansion. The first main member is provided with an undercladding, a core functioning as an optical waveguide provided on a plane of the undercladding, and an overcladding provided so as to cover the core between the undercladding and the overcladding. The first main member is made, for example, of a silica glass or silicon based material and the core is doped with a dopant for increasing the refractive index. While covering the whole of at least one major surface of the first main member, the sub member is fixed to the major surface.

8 Claims, 6 Drawing Sheets

OPTICAL WAVEGUIDE DEVICES AND METHODS OF FABRICATING THE SAME

BACKGROUND OF THE INVENTION

1. Field of the Invention

The present invention relates to optical waveguide devices incorporating a planar optical waveguide and methods of fabricating the same.

2. Related Background Art

The optical waveguide devices are optical devices with an optical waveguide formed on a substrate, and principal materials thereof are silica glass and silicon. These materials expand or contract with change in temperature and also vary their refractive indices. In consequence, the optical path length of the optical waveguide changes in the optical waveguide device and the effective refractive index of the optical waveguide also changes, thereby leading to variation in optical characteristics.

The conventional, optical waveguide devices were thus equipped with a temperature control system to keep the temperature of the devices themselves constant so as to maintain the optical characteristics thereof constant. This temperature control system is composed, for example, of at least a thermometer, a Peltier device, and a control unit. Namely, in the temperature control system of this type, the control unit controls the Peltier device to heat or cool the optical waveguide device so that the temperature of the optical waveguide device itself, measured by the thermometer, is kept constant.

SUMMARY OF THE INVENTION

The inventors investigated the prior arts as described above and found the following problem as a result. The problem was that the temperature control system in the conventional, optical waveguide devices also required a power supply and other elements, in addition to the thermometer, Peltier device, and control unit, and the waveguide devices inevitably became large in size.

The present invention has been accomplished in order to solve the above problem and an object of the present invention is to provide optical waveguide devices having a structure of effectively suppressing the variation in optical characteristics due to temperature change without causing increase in the device size, and methods of fabricating the waveguide devices.

An optical waveguide device according to the present invention comprises at least a first main member having a positive coefficient of linear expansion and a first sub member having a negative coefficient of linear expansion. The first main member has a first major surface and a second major surface opposing the first major surface and a core functioning as an optical waveguide is disposed between these first and second major surfaces. On the other hand, the foregoing sub member is fixed to the first surface of the first main member while covering the entire first major surface of the foregoing first main member.

In the optical waveguide device having the structure as described above, with increase in temperature thereof (e.g., surface temperature), the first main member having the positive coefficient of linear expansion becomes about to expand, while the first sub member having the negative coefficient of linear expansion becomes about to contract. On this occasion, the optical waveguide in the first main member becomes about to prolong its path length because of the expansion of the first main member, while receiving compressive stress from the first sub member because of the contraction thereof. The direction of this compressive stress is parallel to the border between the first main member and the first sub member. Utilization of this difference between the material properties successfully suppresses the variation in the optical characteristics of the optical waveguide in the optical waveguide device due to the temperature change. When the respective linear expansion coefficients of the first main member and first sub member and the respective thicknesses of the first main member and first sub member are properly set, the temperature dependence of optical characteristics of the optical waveguide in the optical waveguide device can be relaxed to a practically negligible level. Since the optical waveguide device can be realized in structure in which the first main member and the first sub member are cemented together, or in structure in which the first main member is directly formed on the first sub member, the size thereof becomes extremely small.

The optical waveguide is normally formed on a substrate, and in the present invention a part of the first main member (e.g., an undercladding), or the first sub member may be the substrate.

The optical waveguide device according to the present invention may have a structure in which sub members having a negative coefficient of linear expansion covers both the first and second major surfaces of the first main member. Namely, the optical waveguide device may comprise a second sub member located so as to sandwich the first main member between the first sub member and the second sub member. In this case, the second sub member has the negative coefficient of linear expansion and is provided directly or through an adhesive on the second major surface while covering the entire second major surface of the first main member. Further, the optical waveguide device according to the present invention may comprise a second main member located so as to sandwich the first sub member between the first main member and the second main member. This second main member has a positive coefficient of linear expansion and is provided directly or through an adhesive on the first sub member while covering an entire major surface thereof opposite to a major surface facing the first major surface of the first main member. In addition, the optical waveguide device according to the present invention may further comprise a third sub member provided directly or through an adhesive on a side face of the first main member, located between the first and second major surfaces, while covering the entire side face. This third sub member has a negative coefficient of linear expansion.

In these cases, the optical waveguide device can be prevented from warping even with change in the temperature of the optical waveguide device itself. Particularly, in the structure wherein the third sub member is fixed around the first main member, even if the optical waveguide device itself changes its temperature because of change in the ambient temperature or the like, the stress on the optical waveguide device will be isotropic on the plane normal to the optical axis of the optical waveguide, thereby effectively suppressing increase in polarization dependence of the optical waveguide in the optical waveguide device.

The optical waveguide device according to the present invention may also comprise a pressure applying structure for applying pressure increasing in proportion to a rise of temperature, in the direction normal to each of the first and second major surfaces of the first main member, in addition to the above various structures. Particularly, the pressure applying structure preferably comprises an insert member having a positive coefficient of linear expansion, and a clamping member for clamping the first main member, sub member, and insert member in the direction normal to each of the first and second major surfaces. This clamping member has a positive coefficient of linear expansion smaller than the linear expansion coefficient of the insert member. In this case, with increase in the temperature of the optical waveguide device itself, expansion of the first main member and contraction of the first sub member causes the optical waveguide in the first main member to be subject to compressive stress in the direction parallel to the first and second major surfaces. In addition thereto, with increase in the temperature of the optical waveguide device itself, the optical waveguide in the first main member is also subject to compressive stress in the direction normal to the first and second major surfaces, because thermal expansion of the insert member is greater than that of the clamping member. In this way, the optical waveguide device is reduced in anisotropy of compressive stress on the optical waveguide, so as to decrease the birefringence of the optical waveguide and thus effectively relax the polarization dependence.

The optical waveguide devices having the structures as described above (the optical waveguide devices according to the present invention) are fabricated by cementing the main member (first main member) and the sub member (first sub member) of the structure as described, together. In this fabrication method, first, the main member having a positive coefficient of linear expansion is prepared, the sub member having a negative coefficient of linear expansion is cemented to one major surface of the main member, and another major surface of the main member is polished or etched. The main member has a first major surface and a second major surface opposing the first major surface and incorporates an optical waveguide located between the first and second major surfaces.

In another fabrication method capable of fabricating the optical waveguide devices having the structures as described above, a sub member having a negative coefficient of linear expansion is prepared, and a main member incorporating an optical waveguide is formed on this sub member by a low-temperature CVD method.

These fabrication methods both are suitable for fabrication of the optical waveguide devices having the structures as described above (the optical waveguide devices according to the present invention). In general, an absolute value of the linear expansion coefficient of the main member is larger than that of the sub member. However, since the thickness of the main member itself can be made thinner by cementing the sub member to one major surface of the main member and thereafter polishing or etching the other major surface of the main member, the temperature dependence of optical characteristics of the optical waveguide in the optical waveguide device can be relieved to the practically negligible level. Since the thickness of the main member can be made thinner by forming the main member on the sub member by the low-temperature CVD method, the same effect can be achieved thereby.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 6 to 6D are views for explaining fabrication and packaging steps of the optical waveguide device according to the fifth embodiment.

FIG. 7 is a view for explaining part of the packaging step common to application examples of the optical waveguide device according to the fifth embodiment

DESCRIPTION OF THE PREFERRED EMBODIMENTS

The embodiments of the optical waveguide devices according to the present invention will be described along with their fabrication methods, referring to FIGS. 1, 2A to 2C, 3 to 5, 6A to 6D, and 7 to 11. In the description of the drawings the same elements will be denoted by the same reference symbols and redundant description will be omitted.

First Embodiment

Figure 1:
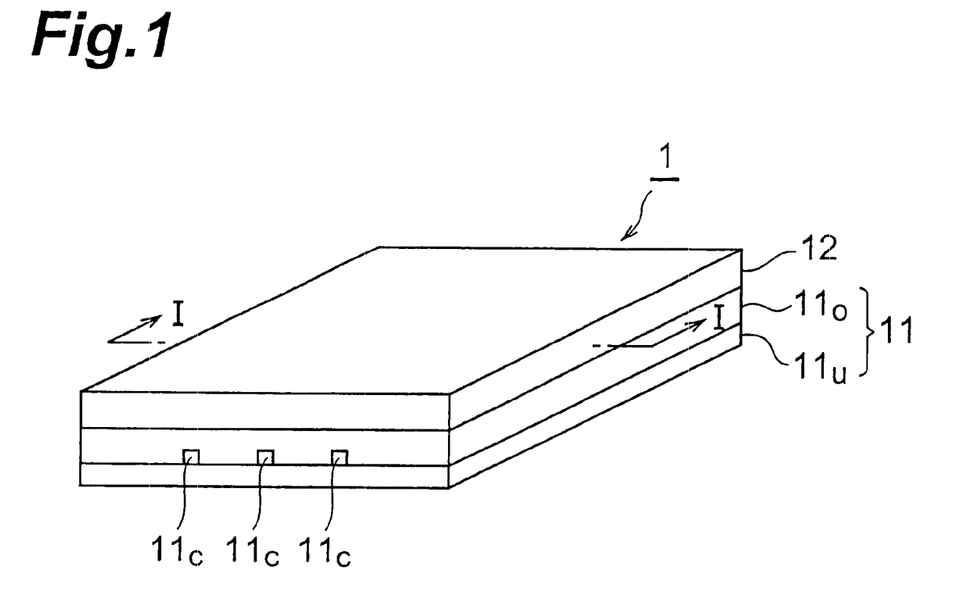
FIG. 1 is a drawing showing the structure of the first embodiment of the optical waveguide device according to present invention.

The first embodiment of the optical waveguide device and the fabrication method thereof according to the present invention will be described first. FIG. 1 is a view showing the structure of the optical waveguide device 1 according to the first embodiment. This optical waveguide device 1 is provided with a first main member 11 having a positive coefficient of linear expansion and a sub member 12 having a negative coefficient of linear expansion, which is fixed to the first main member 11 so as to cover the whole of one major surface of the first main member 11.

The first main member 11 consists of an undercladding $11_u$, cores $11_c$ disposed on the undercladding $11_u$, and an overcladding $11_o$ disposed on the undercladding $11_U$ while covering the cores $11_c$. The first main member 11 is made, for example, of a principal material of silica glass or silicon and the cores $11_c$ are doped with a dopant, e.g., $GeO_2$ for raising the refractive index. The high-index cores $11_c$ are surrounded by the low-index undercladding $11_u$ and overcladding $11_o$, and the cores $11_c$ mainly function as optical waveguides.

The sub member 12 is fixed to the upper surface of the overcladding $11_o$ in the first main member 11. A suitable material for the sub member 12 is, for example, porous glass having the linear expansion coefficient of about $-8\times10_{-6}/K$, or crystallized glass having the linear expansion coefficient of about $-8\times10_{-7}/$(e.g., Neoceram N0 available from Nippon Electric Glass Co., Ltd).

Figure 2A:
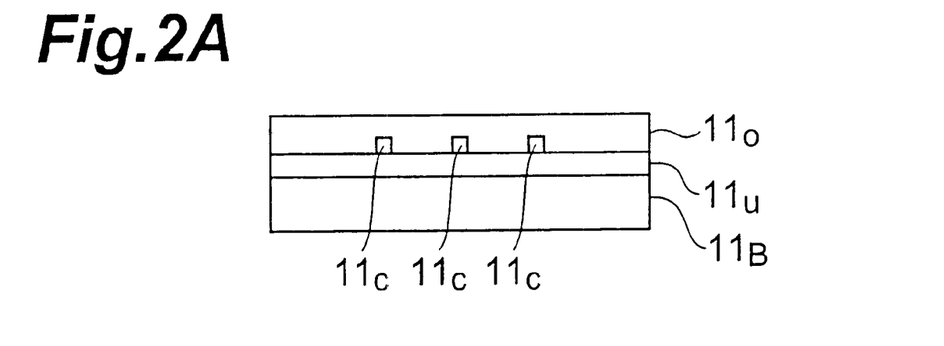
FIGS. 2A to 2C are views for explaining fabrication steps of the optical waveguide device in the first embodiment shown in FIG. 1.
Figure 2B:
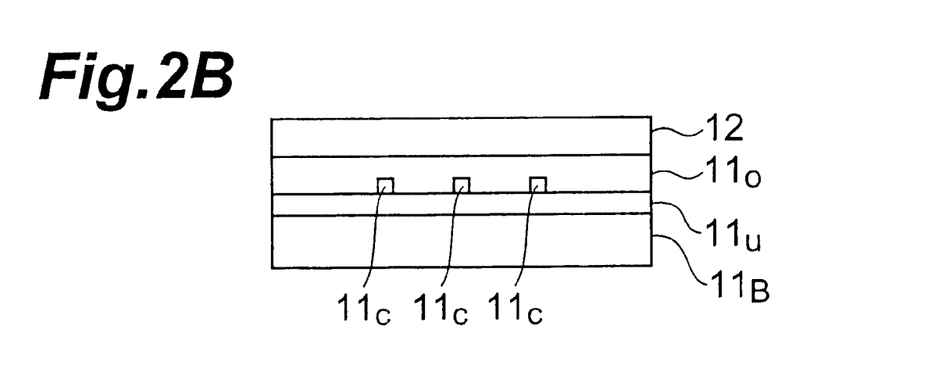
Figure 2C:
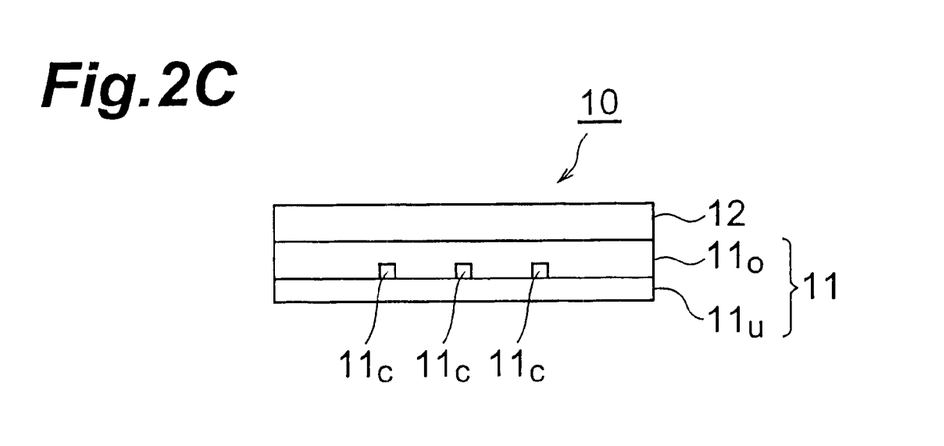

FIGS. 2A to 2C are views for explaining the fabrication steps of the optical waveguide device 1 in the first embodiment. FIGS. 2A to 2C are illustrated all corresponding to the cross section along line I—I in FIG. 1.

In the first step, the undercladding $11_u$, cores $11_c$, and overcladding $11_o$ are formed on a base or substrate $11_B$ by CVD (chemical vapor deposition), FHD (Flame Hydrolysis Deposition), or the like (FIG. 2A). Then the sub member 12 is cemented through an adhesive to the upper surface of the overcladding $11_o$ (FIG. 2B). Here the adhesive is preferably one having high bond strength for adhesion between glasses, particularly, one resistant to shear stress and is suitably selected, for example, from acrylic, epoxy, or phenolic adhesives. After that, the substrate $11_B$ is removed by polishing or etching (FIG. 2C). It is noted here that this substrate $11_B$ does not have to be removed completely. The substrate $11_B$ may remain in part. Through the above steps, the optical waveguide device 1 of the first embodiment is obtained.

The fabrication method of the optical waveguide device 1 does not have to be limited to the above method. For example, the optical waveguide device 1 of the first embodiment can also be fabricated by successively depositing the overcladding $11_o$, cores $11_c$, and undercladding $11_u$ on the sub member 12 by the low-temperature CVD method.

In this optical waveguide device 1 of the first embodiment, with increase in the temperature thereof (e.g., surface temperature), the first main member 11 having the positive linear expansion coefficient becomes about to expand while the sub member 12 having the negative linear expansion coefficient becomes about to contract. As the temperature of the optical waveguide device 1 itself increases in this way, the optical waveguides in the first main member 11 become about to prolong their path length because of the expansion of the first main member 11. On the other hand, the optical waveguides are subject to the compressive stress due to the contraction of the sub member 12. The direction of this compressive stress is the direction along the boundary surface between the first main member 11 and the sub member 12. Accordingly, even if there occurs change in the temperature of the optical waveguide device 1 itself, the optical characteristics of the optical waveguides in the optical waveguide device 1 can be effectively prevented from varying. When the respective linear expansion coefficients of the first main member 11 and sub member 12 and the respective thicknesses of the first main member 11 and sub member 12 are properly set, the temperature dependence of optical characteristics of the optical waveguides in the optical waveguide device 1 can be relieved to the practically negligible level. Since the optical waveguide device 1 has the cemented structure of the first main member 11 and the sub member 12, the size thereof is sufficiently small, as against the conventional devices.

Second Embodiment

Figure 3:
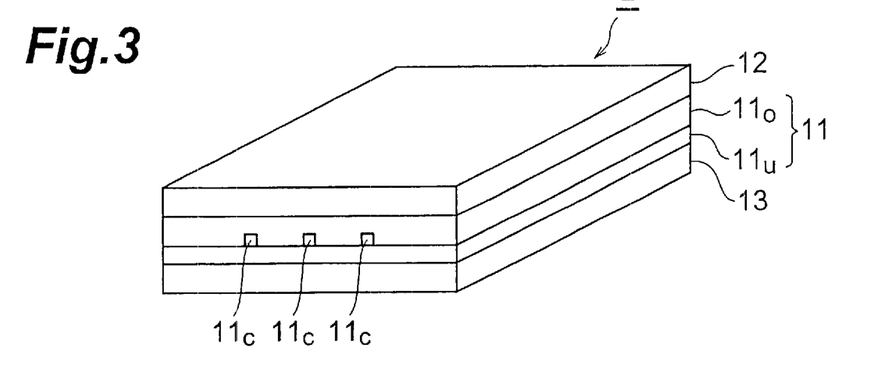
FIG. 3 is a drawing showing the structure of the second embodiment of the optical waveguide device according to the present invention.

The second embodiment of the optical waveguide device according to the present invention will be described below. FIG. 3 is a view showing the structure of the optical waveguide device 2 according to the second embodiment.

The optical waveguide device 2 of the second embodiment is provided with a first main member 11 having a positive coefficient of linear expansion, which incorporates optical waveguides, a sub member 12 having a negative coefficient of linear expansion, which is fixed to the first main member 11 so as to cover the whole of one major surface of the first main member 11, and another sub member 13 having a negative coefficient of linear expansion, which is fixed to the first main member 11 so as to cover the whole of the other major surface of the first main member 11.

A material of the sub member 13 is selected in much the same manner as the material of the sub member 12. The optical waveguide device 2 of the second embodiment is fabricated by cementing the sub member 13 to the lower surface of the undercladding $11_u$ of the optical waveguide device 1 according to the first embodiment. In other words, the optical waveguide device 2 of the second embodiment has the laminated structure in which the first main member 11 is sandwiched between the sub members 12, 13.

The optical waveguide device 2 of the second embodiment presents the effect similar to that achieved by the optical waveguide device of the first embodiment, and also provides the following effect. Namely, since the device has the structure in which the sub member 12 is fixed to one major surface of the first main member 11 while the sub member 13 to the other major surface of the first main member 11, the optical waveguide device 2 itself will be prevented from warping even if there occurs change in the temperature of the optical waveguide device 2 itself (e.g., surface temperature). Particularly, when the sub members 12, 13 are made of an identical material and in an equal thickness, the optical waveguide device 2 is successfully prevented from warping with temperature change.

Third Embodiment

Figure 4:
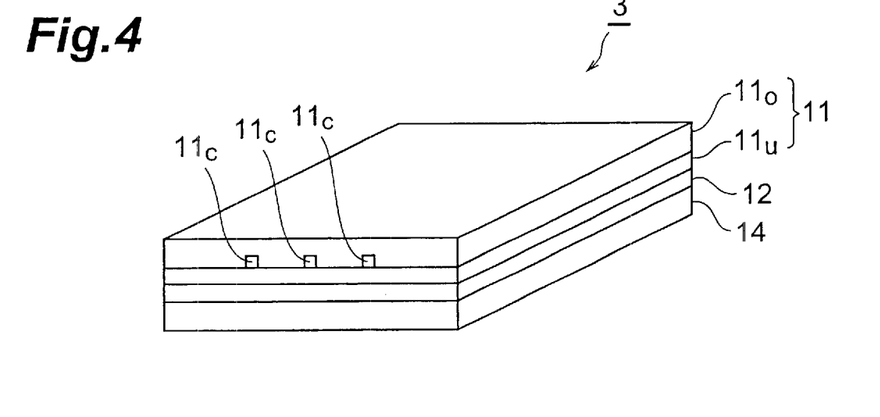
FIG. 4 is a drawing showing the structure of the third embodiment of the optical waveguide device according to the present invention.

The third embodiment of the optical waveguide device according to the present invention will be described below. FIG. 4 is a view showing the structure of the optical waveguide device 3 according to the third embodiment. The optical waveguide device 3 of the third embodiment is provided with a first main member 11 having a positive coefficient of linear expansion, which incorporates optical waveguides, a sub member 12 having a negative coefficient of linear expansion, which is placed on one major surface of the first main member 11 and fixed so as to cover the entire major surface, and a second main member 14 having a positive coefficient of linear expansion, which is fixed to the sub member 12 so as to sandwich the sub member 12 between the first main member 11 and the second main member 14. The second main member 14 can be made, for example, of a principal material of silica glass or silicon, similar to the first main member 11, or may be made of a metal material, e.g., aluminum.

The optical waveguide device 3 is fabricated by fixing the second main member 14 onto the surface opposite to the first main member 11, of the sub member 12 in the optical waveguide device 1 according to the aforementioned first embodiment. When the second main member 14 is made of the principal material of silica glass, the second main member 14 is not deposited on the sub member 12 by the FHD method, but by the low-temperature CVD method. On the other hand, when the second main member 14 is made of a metal material, the second main member 14 is deposited on the sub member 12 by evaporation.

The optical waveguide device 3 provides the effect similar to that achieved by the optical waveguide device 1 of the aforementioned first embodiment, and also provides the following effect. Namely, the first main member 11 and the second main member 14 are fixed to the respective major surfaces of the sub member 12 opposing each other. This can suppress the warpage of the optical waveguide device 3 even if there occurs change in the temperature of the optical waveguide device 3 itself. Particularly, when the first and second main members 11, 14 are made of an identical material and in an equal thickness, the optical waveguide device 3 can be effectively prevented from warping even with temperature change.

When the first and second main members 11, 14 are made of their respective materials different from each other, or in their respective thicknesses different from each other, there is the possibility of warpage of the optical waveguide device 3 with temperature change. This will be discussed below.

Samples were prepared in common structure in which the cross-sectional size of each core $11_c$ was 6 μm×6 μm, intervals between the cores $11_c$ were 28 μm, the thickness of the overcladding $11_o$ was 0.03 mm, and the thickness of the undercladding $11_u$. The thickness of the sub member 12 was 1.0 mm. The principal material of the first main member 11 was silica glass, the linear expansion coefficient of the overcladding $11_o$ $0.70 \times 10_{-6}$/K, and the linear expansion coefficient of the cores $11_c$, $0.97 \times 10_{-6}$/K. The principal material of the second main member 14 was aluminum and the linear expansion coefficient thereof $25 \times 10_{-6}$/K. Further, the principal material of the sub member 12 was N-801 and the linear expansion coefficient thereof $-8.0 \times 10_{-6}$/K.

The samples prepared were of three types; the optical waveguide device without the second main member 14 (Sample 1); the optical waveguide device in which the thickness of the second main member 14 was set to 0.01 mm (Sample 2); and the optical waveguide device in which the thickness of the second main member 14 was set to 0.30 mm (Sample 3). The optical waveguide device of Sample 1 corresponds to the optical waveguide device 1 according to the foregoing first embodiment.

With increase in the temperature of the device itself (e.g., surface temperature), Sample 1 warped in convex shape on the side of the first main member 11 incorporating the optical waveguides, so as to prolong the optical path length of the optical waveguides. However, when the material having the linear expansion coefficient of $-9.0 \times 10_{-6}$/K was applied to the sub member 12, the warpage of Sample 1 due to the temperature change was effectively suppressed and there occurred no change in the optical path length of the optical waveguides, either.

Sample 2 suffered from neither warpage nor change of the optical path length of the optical waveguides even with change in the temperature of the device itself.

With increase in the temperature of the device itself, Sample 3 warped in concave shape on the side of the first main member 11 incorporating the optical waveguides, so as to shorten the optical path length of the optical waveguides. When the material having the linear expansion coefficient of $-6.0 \times 10_{-6}$/K was applied to the sub member 12, the warpage of Sample 3 due to the temperature change was effectively suppressed and there occurred no change in the optical path length of the optical waveguides, either.

As discussed above, when the first and second main members 11, 14 are made of their respective materials different from each other or in their respective thicknesses different from each other, there is the possibility that the optical waveguide device warps with temperature change. However, even if the first and second main members 11, 14 are made of their respective materials different from each other, it is also feasible to effectively suppress the occurrence of warpage with temperature change and the occurrence of change in the optical path length of the optical waveguides, by properly setting the materials and thicknesses of the first main member 11, sub member 12, and second main member 14.

Fourth Embodiment

Figure 5:
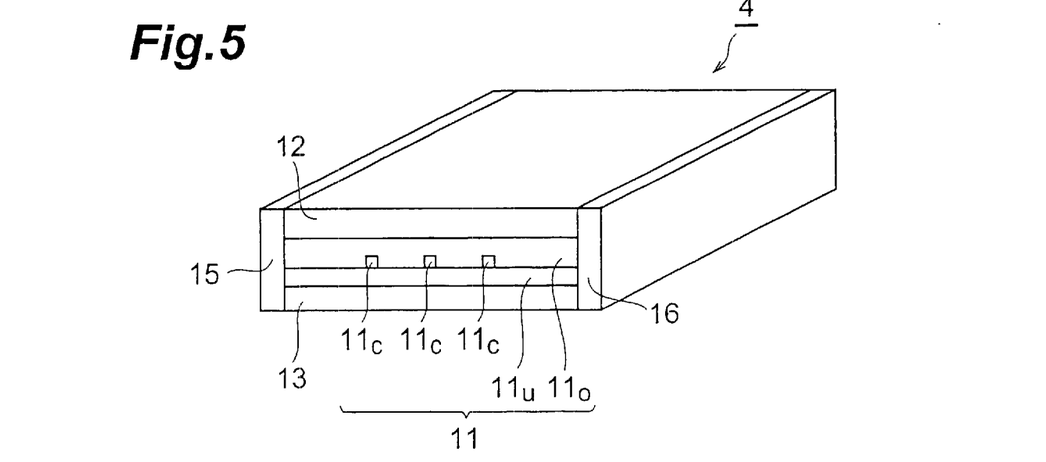
FIG. 5 is a drawing showing the structure of the fourth embodiment of the optical waveguide device according to the present invention.

The fourth embodiment of the optical waveguide device according to the present invention will be described below. FIG. 5 is a view showing the structure of the optical waveguide device 4 according to the fourth embodiment. The optical waveguide device 4 of the fourth embodiment is provided with a first main member 11 having a positive coefficient of linear expansion, which incorporates optical waveguides, and sub members fixed so as to surround the optical axes of the optical waveguides around the first main member 11. Namely, the optical waveguide device 4 is constructed in such structure that the sub members 12, 13 having the negative coefficient of linear expansion are fixed respectively on the major surfaces of the first main member 11 opposing each other, the sub member 13 having the negative coefficient of linear expansion is fixed on the lower surface of the first main member 11, and the sub members 15, 16 having the negative coefficient of linear expansion are fixed respectively on the side faces of the first main member 11 opposing each other.

A material for each of the sub member 13, sub member 15, and sub member 16 is selected from the materials as used for the foregoing sub member 12. The optical waveguide device 4 of the fourth embodiment is fabricated by cementing the sub members 15, 16 to the both side faces of the optical waveguide device 2 of the aforementioned second embodiment.

The optical waveguide device 4 provides the effects similar to those achieved by the optical waveguide device 2 of the foregoing second embodiment, and also provides the following effect. Since the sub members 12, 13, 15, and 16 are fixed around the first main member 11, the stress exerted on the optical waveguide device 4 becomes isotropic on the plane normal to the optical axes of the optical waveguides even with occurrence of temperature change, so as to effectively suppress increase in the polarization dependence of the optical waveguides provided in the optical waveguide device 4.

Fifth Embodiment

The fifth embodiment of the optical waveguide device according to the present invention will be described below. The optical waveguide device of the fifth embodiment is provided with an insert member 21 and a clamping member 31, in addition to the structure of the optical waveguide device 3 (including the first main member 11, sub member 12, and second main member 14) according to the foregoing third embodiment. The fifth embodiment having this structure is fabricated through the steps of FIGS. 6A to 6D. FIGS. 6A to 6D are views for explaining the respective steps of the fabrication method and packaging method of the optical waveguide device 5 according to the fifth embodiment.

Figures 6A, 6B, 6C, 6D, 7:
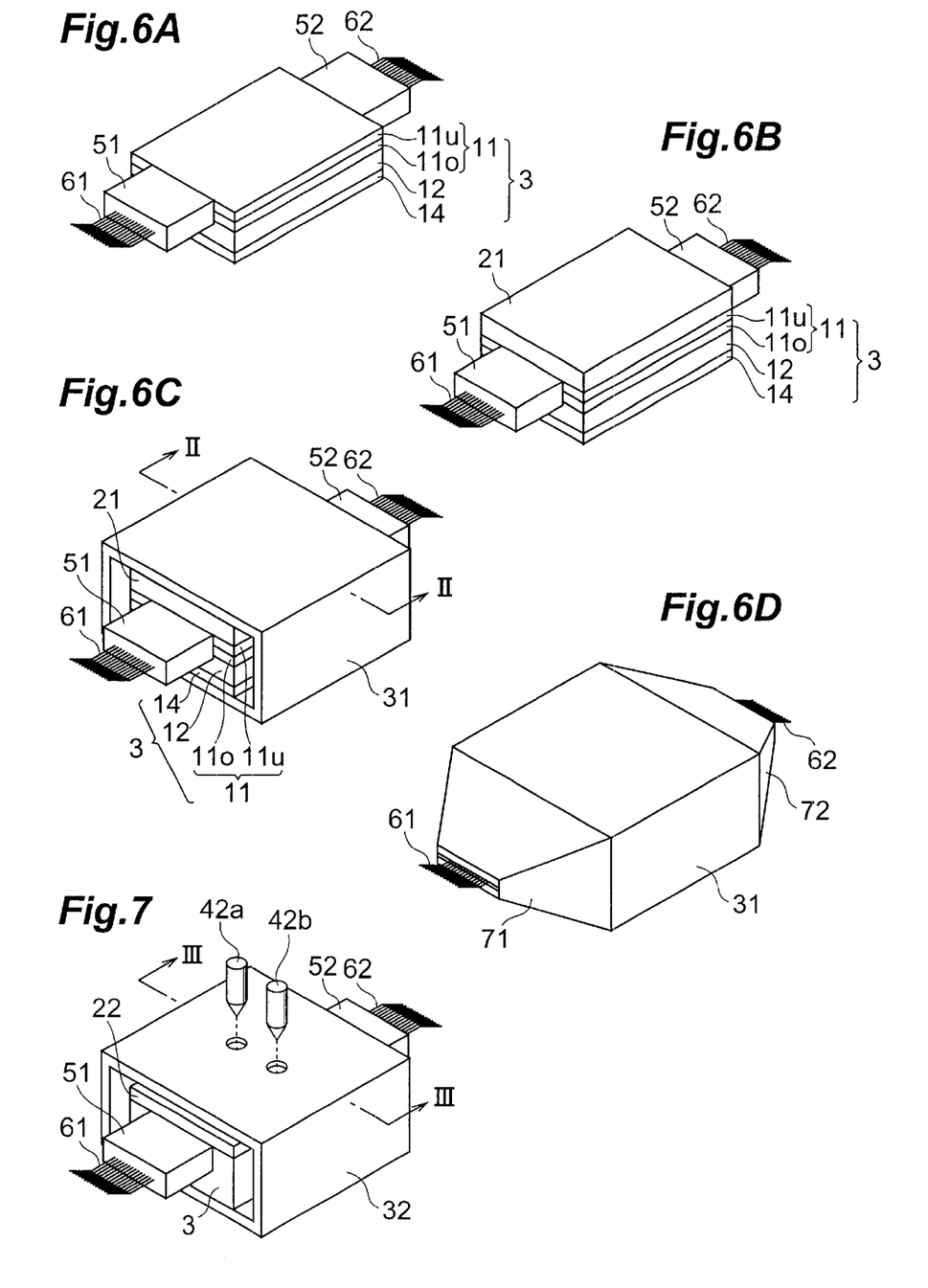

First, the optical waveguide device having the structure similar to the third embodiment (optical waveguide device 3), which is fabricated by the fabrication method described above in the section of the third embodiment, is prepared. Then optical connectors 51, 52 are connected to the both end faces of this optical waveguide device 3 (FIG. 6A). At this time, the connectors are connected so that the entrance/exit ends of the optical waveguides on the both end faces of the optical waveguide device 3 are optically coupled to the end faces of optical fibers (or optical fiber bundles) 61, 62 in the optical connectors 51, 52.

Figure 8:
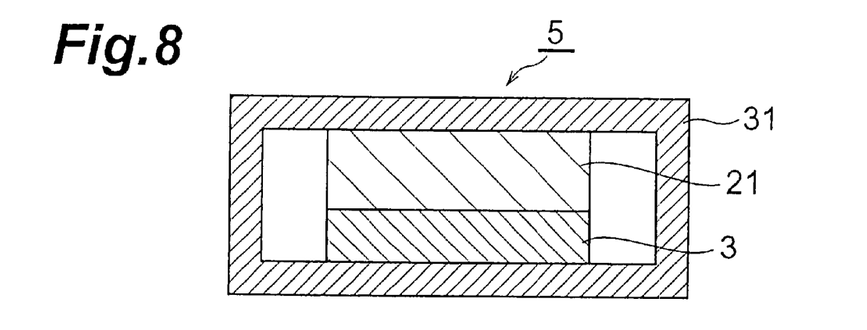
FIG. 8 is a view showing the cross-sectional structure of the optical waveguide device according to the fifth embodiment, as cut along line II—II shown in FIG. 6C.

Then the insert member 21 is mounted on the first main member 11 (FIG. 6B), and these first main member 11 and insert member 21 are inserted together into the clamping member 31 so as to be clamped thereby (FIG. 6C). FIG. 8 is a view showing the cross-sectional structure along line II—II in FIG. 6C, of the optical waveguide device 5 of the fifth embodiment.

The clamping member 31 is composed, for example, of four flat plates. These flat plates are assembled into the tubular clamping member 31. The optical waveguide device 3 and insert member 21 are clamped by the clamping member constructed in this structure. The clamping member 31 may be an integral tubular member (of a rectangular cross section). In this case, it is preferable to first fabricate the optical waveguide device 5 of the fifth embodiment preliminarily by clamping the optical waveguide device 3 and insert member 21 by the clamping member 31 and thereafter performing the connection operation of the optical connectors 51, 52 thereto.

After that, termination is implemented by covering the optical connectors 51, 52 with respective cover members 71, 72 of substantially truncated pyramid shape (FIG. 6D).

Through the above steps, the optical waveguide device 5 of the fifth embodiment is fabricated and packaged. After completion of the packaging as illustrated in FIG. 6D, for example, optical signals injected from the optical fibers 61 into the optical waveguide device 5 are subjected to predetermined processing (e.g., demultiplexing, multiplexing, filtering, and so on). Then the optical signals thus processed are outputted to the optical fibers 62. On this occasion, the temperature dependence of optical characteristics of the optical waveguide device 5 is effectively controlled and the polarization dependence in the optical waveguides is also relieved. Therefore, stable optical processing is implemented even with occurrence of temperature change of the optical waveguide device 5 itself.

In the optical waveguide device 5 of the fifth embodiment (FIG. 8), preferably, the insert member 21 and clamping member 31 have their respective, positive coefficients of linear expansion, and the linear expansion coefficient of the clamping member 31 is smaller than that of the insert member 21. This condition is met, for example, by using aluminum as the principal material of the insert member 21 and invar as the principal material of the clamping member 31. The clamping member 31 clamps the optical waveguide device 3 (having the structure similar to the third embodiment) and the insert member 21 in the direction normal to the installation plane of the optical waveguides (parallel to the major surfaces of the first main member 11), as described previously. FIG. 8 is a view showing the cross-sectional structure along line II—II in FIG. 6C.

The optical waveguide device 5 of the fifth embodiment also provides the effects similar to those achieved by the optical waveguide devices 1 to 4 of the foregoing first to fourth embodiments, and with increase in the temperature of the optical waveguide device itself, the optical waveguides in the first main member 11 are subject to compressive stress along the direction parallel to the installation plane of the optical waveguides because of expansion of the first main member 11 and contraction of the sub member 12. In addition, since in the optical waveguide device 5 thermal expansion of the insert member 21 is greater than that of the clamping member 31, the optical waveguides in the first main member 11 are also subject to compressive stress in the direction normal to the installation plane of the optical waveguides with increase of temperature. Namely, the insert member 21 and clamping member 31 act as a pressure applying structure for applying the pressure according to temperature in the direction normal to the installation plane of the optical waveguides.

As described above, since the optical waveguide device 5 of the fifth embodiment has the structure for reducing the anisotropy of compressive stress applied on the optical waveguides, the birefringence of the optical waveguides is reduced and the polarization dependence is also relaxed. The birefringence of the optical waveguides is preferably not more than $0.6 \times 10^{-4}$, and the birefringence of the optical waveguides can be set in the preferred range by properly selecting the respective materials and dimensions of the insert member 21 and clamping member 31.

Application examples of the optical waveguide device 5 according to the fifth embodiment will be described referring to FIGS. 9 to 11. FIG. 7 is a view for explaining part of the packaging steps common to the application examples of the optical waveguide device according to the fifth embodiment.

Figure 9:
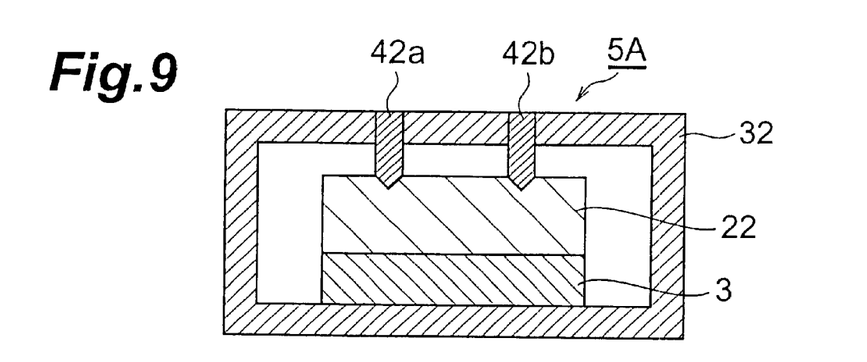
FIG. 9 is a view showing the cross-sectional structure of a first application example of the optical waveguide device (fifth embodiment) shown in FIG. 8.

FIG. 9 is a view showing the cross-sectional structure of the first application example of the optical waveguide device according to the fifth embodiment. This cross section corresponds to a cross section along line III—III in FIG. 7. This optical waveguide device 5A of the first application example is provided with an insert member 22, a clamping member 32, and rodlike support members 42a, 42b, in addition to the structure similar to the optical waveguide device 3 of the third embodiment. The insert member 22, clamping member 32, and support members 42a, 42b have their respective, positive coefficients of linear expansion, and the respective linear expansion coefficients of the clamping member 32 and support members 42a, 42b are smaller than that of the insert member 22. For example, the insert member 22 is made of aluminum or the like, the clamping member 32 of invar or the like, and each of the support members 42a, 42b of resin or the like. The clamping member 32 houses the optical waveguide device 3, insert member 22, and support members 42a, 42b inside. The clamping member 32, together with the support members 42a, 42b, clamps the optical waveguide device 3 and insert member 22 in the direction normal to the installation plane of the optical waveguides (see FIG. 7). In the optical waveguide device 5A, since thermal expansion of the insert member 22 is greater than that of the clamping member 32 and the support members 42a, 42b, the optical waveguides in the first main member 11 are also subject to compressive stress in the direction normal to the installation plane of the optical waveguides with increase in temperature. Since this optical waveguide device 5A has the structure for reducing the anisotropy of compressive stress exerted on the optical waveguides, the birefringence of the optical waveguides becomes small, so as to relieve the polarization dependence of the optical waveguides.

Figure 10:
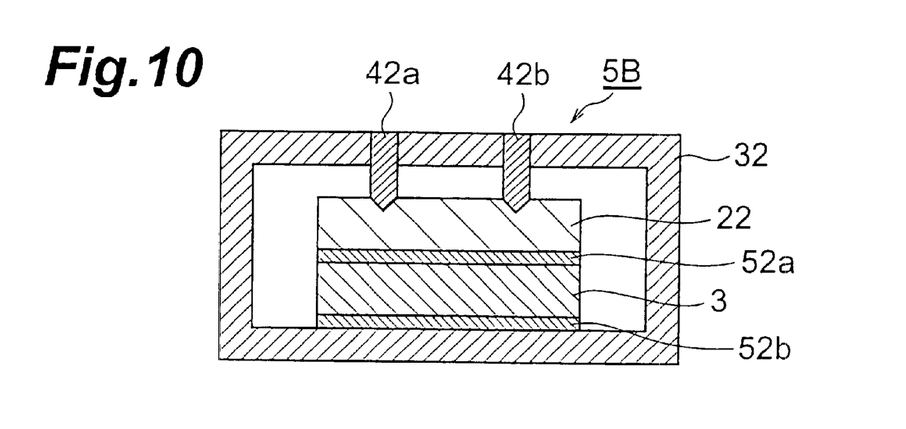
FIG. 10 is a view showing the cross-sectional structure of a second application example of the optical waveguide device (fifth embodiment) shown in FIG. 8.

FIG. 10 is a view showing the cross-sectional structure of the second application example of the optical waveguide device according to the fifth embodiment. This cross section of the second application example also corresponds to the cross section along line III—III in FIG. 7. The optical waveguide device 5B of the second application example is provided with platelike protective members 52a, 52b, in addition to the structure of the optical waveguide device 5A of the first application example described above. The protective member 52a is interposed between the optical waveguide device 3 and the insert member 22, while the protective member 52b is between the optical waveguide device 3 and the bottom surface of the clamping member 32. The optical waveguide device 5B provides the action and effects similar to those of the optical waveguide device 5A according to the foregoing first application example and also presents the effect of protecting the optical waveguides by the protective members 52a, 52b.

Figure 11:
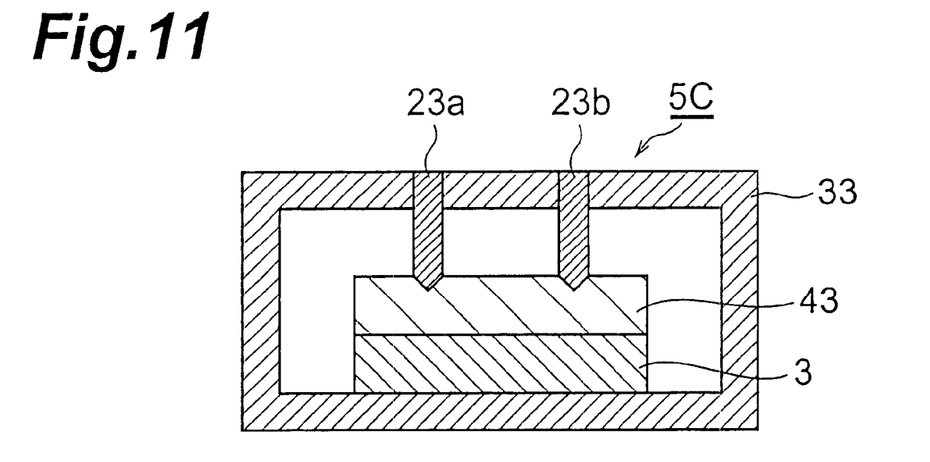
FIG. 11 is a view showing the cross-sectional structure of a third application example of the optical waveguide device (fifth embodiment) shown in FIG. 8.

FIG. 11 is a view showing the cross-sectional structure of the third application example of the optical waveguide device according to the fifth embodiment. This cross section of the third application example also corresponds to the cross section along line III—III in FIG. 7. The optical waveguide device 5C of the third application example has rodlike insert members 23a, 23b, a clamping member 33, and a platelike protective member 43, in addition to the structure of the optical waveguide device 3 according to the third embodiment. The insert members 23a, 23b, clamping member 33, and protective member 43 have their respective, positive coefficients of linear expansion, and the respective linear expansion coefficients of the clamping member 33 and protective member 43 are smaller than that of the insert members 23a, 23b. For example, the insert members 23a, 23b are made each of aluminum or the like, and the clamping member 33 and protective member 43 each of invar or the like. The clamping member 33 houses the optical waveguide device 3, insert members 23a, 23b, and protective member 43 inside. Then the clamping member 33, together with the protective member 43, clamps the optical waveguide device 3 and insert members 23a, 23b in the direction normal to the installation plane of the optical waveguides. In this optical waveguide device 5C, since thermal expansion of the insert members 23a, 23b is greater than that of the clamping member 33 and protective member 43, the optical waveguides in the first main member 11 are also subject to compressive stress in the direction normal to the installation plane of the optical waveguides. Since this optical waveguide device 5C also has the structure for reducing the anisotropy of compressive stress exerted on the optical waveguides, the birefringence of the optical waveguides is small, so as to relieve the polarization dependence of the optical waveguides.

According to the present invention, as described above, the sub member having the negative coefficient of linear expansion is fixed on at least one major surface of the first main member incorporating the optical waveguide and having the positive coefficient of linear expansion. This structure effectively suppresses the variation in the optical characteristics of the optical waveguide even with increase in the temperature of the optical waveguide device itself.

The respective linear expansion coefficients of the first main member, incorporating the optical waveguide, and the sub member and the respective thicknesses of the first main member and sub member are properly set, whereby the temperature dependence of optical characteristics of the optical waveguide in the optical waveguide device is relieved to the practically negligible level. Then the compact optical waveguide device is obtained by adopting the cemented structure of the first main member and sub member.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical waveguide device comprising:
   a first main member having a first major surface and a second major surface opposing said first major surface, and incorporating an optical waveguide located between said first and second major surfaces, said first main member having a positive coefficient of linear expansion; and
   a first sub member fixed to said first major surface while covering the whole of said first major surface of said first main member, said first sub member having a negative coefficient of linear expansion.

2. An optical waveguide device of claim 1, further comprising:
   a second sub member located so as to sandwich said first main member between said first sub member and said second sub member, wherein said second sub member has a negative coefficient of linear expansion and is fixed to said second major surface while covering the whole of said second major surface of said first main member.

3. An optical waveguide device of claim 1, further comprising:
   a second main member located so as to sandwich said first sub member between said first main member and said second main member, wherein said second main member has a positive coefficient of linear expansion and is fixed to said first sub member while covering the whole of a major surface opposing a major surface facing said first major surface of said first main member.

4. An optical waveguide device of claim 1, further comprising:
   a third sub member fixed to a side face of said first main member, located between said first and second major surfaces, while covering the whole of said side face of said first main member, wherein said third sub member has a negative coefficient of linear expansion.

5. An optical waveguide device of claim 1, further comprising:
   a pressure applying structure for applying pressure increasing in proportion to a rise of temperature, onto said first main member in a direction perpendicular to said first and second major surfaces of said first main member.

6. An optical waveguide device of claim 5, wherein said pressure applying structure comprises:
   an insert member having a positive coefficient of linear expansion; and
   a clamping member having a structure for clamping said first main member, said first sub member, and said insert member along the direction perpendicular to said first and second major surfaces of said first main member, wherein said clamping member has a positive coefficient of linear expansion smaller than the coefficient of linear expansion of said insert member.

7. A method of fabricating an optical waveguide device of claim 1, said method comprising the steps of:
   preparing a main member having a first major surface and a second major surface opposing said first major surface and incorporating an optical waveguide located between said first and second major surfaces, said main member having a positive coefficient of linear expansion;

cementing a sub member having a negative coefficient of linear expansion, to the whole of said first major surface of said main member; and polishing or etching said second major surface of said main member.

8. A method of fabricating an optical waveguide device of claim 1, said method comprising the steps of:

preparing a sub member having a negative coefficient of linear expansion; and forming a first main member having a first major surface and a second major surface opposing said first major surface and incorporating an optical waveguide located between said first and second major surfaces, on said sub member by a low-temperature CVD method, said first main member having a positive coefficient of linear expansion.

* * * * *